No. 759,287. PATENTED MAY 10, 1904.
R. A. KETTLE.
RELEASING SNAP.
APPLICATION FILED DEC. 5, 1903.
NO MODEL.
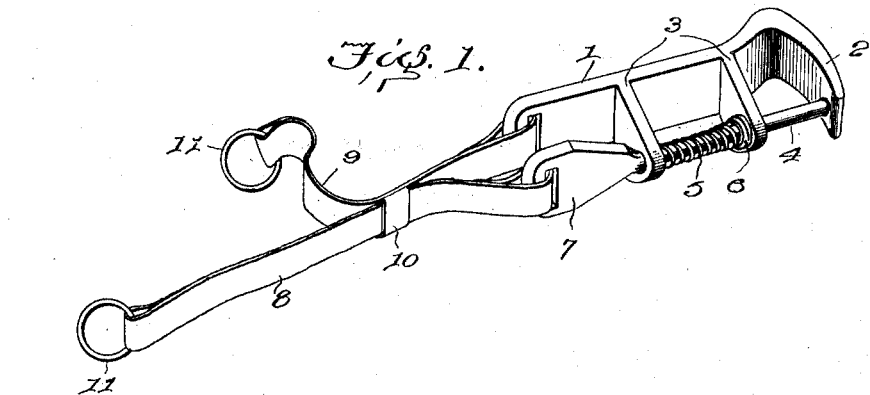
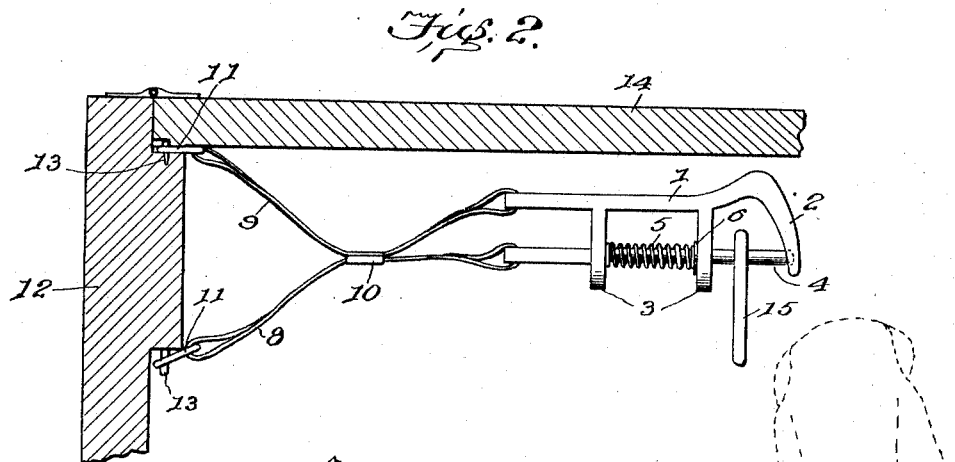
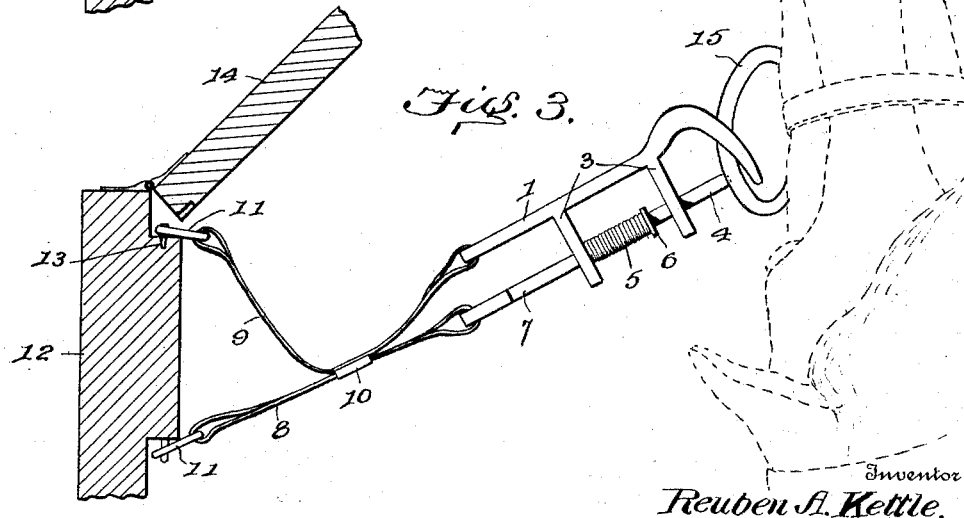
Witnesses
G. Howard Walmsley.
F. W. Schaefer.
Inventor
Reuben A. Kettle,
By
Attorney No. 759,287.

Patented May 10, 1904.

UNITED STATES PATENT OFFICE.

REUBEN A. KETTLE, OF KENTON, OHIO.

RELEASING-SNAP.

SPECIFICATION forming part of Letters Patent No. 759,287, dated May 10, 1904.

Application filed December 5, 1903. Serial No. 183,863. (No model.)

*To all whom it may concern:*

Be it known that I, REUBEN A. KETTLE, a citizen of the United States, residing at Kenton, in the county of Hardin and State of Ohio, have invented certain new and useful Improvements in Releasing-Snaps, of which the following is a specification, reference being had therein to the accompanying drawings.

This invention relates to hitching and releasing snaps for horses, and is specially devised for use in fire-department and police stable service.

The object of the invention is to provide a hitching device which securely hitches the horse while the stall-door is closed, but which will be automatically released when the stall-door is opened by the forward movement of the horse in the manner hereinafter described.

Referring to the accompanying drawings, Figure 1 is a perspective view of a hitching and releasing device for horses constructed in accordance with this invention. Fig. 2 is a plan view illustrating the hitching and releasing device secured to the door-jamb and showing the position of the device when the horse is hitched and the stall-door closed. Fig. 3 is a similar view showing the position of the hitching and releasing device when the stall-door has been thrown open and the horse is releasing himself.

The device comprises a shank or body 1, terminating in a projection 2, arranged at an angle to the body or shank, said angle being preferably greater than a right angle, as shown in Fig. 2. The shank is also provided on the same side as that on which the projection 2 is located with guide-lugs 3, preferably two in number and apertured for the passage of a locking-pin 4. One end of this pin is held normally in engagement with the projection 2 by means of a spring 5, coiled around the locking-pin between the lugs 3 and bearing at one end against a suitable collar or enlargement 6 on the pin, the other end of said spring bearing against the lug 3 farthest from the projection 2. The locking-pin is provided with a head 7, adapted to receive a strap or similar flexible connecting device 8, and the adjacent end of the shank is similarly adapted to receive a strap or flexible connecting device 9. One of these straps, in the present instance the strap 9, is provided with a loop 10, through which the other strap is free to slide. Each of the straps has its other end arranged for attachment to a suitable securing device, preferably by means of a ring 11.

In practice the free ends of the straps are connected to the opposite sides of the door-jamb 12 by staples 13 or in any other suitable manner. The stall-door is indicated by the reference-numeral 14. When in use, a ring 15 or any other part of the halter or head-gear of the horse is engaged by the locking-pin 4 and is held from slipping off of said pin by the engagement of the free end of said pin with the projection 2. When the stall-door is closed, as shown in Fig. 2, the horse cannot move forward, and any backward movement will merely result in putting a strain upon the strap 9, so that the locking-pin remains in its normal position and the horse cannot free himself. When the stall-door is opened, as shown in Fig. 3, the horse moves forward, as he is trained to do, and this forward movement results in a tightening of the strap 8, as shown in said figure, so that the locking-pin 4 is drawn away from the projection 2, and the ring or other part of the harness 15 becomes disengaged from the device, thus freeing the horse. This disengagement is facilitated by the inclination of the projection 2 to the shank of the device. It will thus be seen that as long as the stall-door is closed the horse cannot free himself; but as soon as the door is opened the natural forward movement of the animal automatically releases him.

I do not wish to be understood as limiting myself strictly to the precise details of construction hereinbefore described and shown in the accompanying drawings, as the same may obviously be modified without departing from the principle of my invention.

Having thus fully described my invention, what I claim as new, and desire to secure by Letters Patent, is—

1. In a device of the character described, a shank or body having a projection at an angle thereto, a spring-actuated pin carried by said body and normally engaging the projection, and separate flexible connections extending from the body and pin respectively to separated points of attachment, substantially as described.

2. In a device of the character described, a shank or body having a projection at an angle thereto, a spring-actuated pin carried by said body and normally engaging the projection, and separate straps extending from the body and pin respectively to separated points of attachment, one of said straps being provided with a loop through which the other strap is adapted to slide freely, substantially as described.

3. In a device of the character described, a shank or body having at one end a projection inclined thereto at an angle greater than a right angle, a spring-actuated pin carried by said body and normally engaging the projection, and separate flexible connections extending from the body and pin respectively to separated points of attachment, substantially as described.

4. In a device of the character described, a shank or body having at one end a projection, and a strap or body connected to the other end thereof, said shank or body being provided with guide-lugs, a locking-pin mounted to slide longitudinally in said guide-lugs, a spring holding one end of said locking-pin normally in engagement with the projection, and a strap connected to the other end of said locking-pin, substantially as described.

5. In a device of the character described, a shank or body having at one end a projection, and a strap or body connected to the other end thereof, said shank or body being provided with guide-lugs, a locking-pin mounted to slide longitudinally in said guide-lugs, a spring holding one end of said locking-pin normally in engagement with the projection, and a strap connected to the other end of said locking-pin, one of said straps being provided with a loop through which the other strap slides freely, and the free ends of both straps being provided with means for connecting them to separated points of attachment, substantially as described.

6. The combination, with a stall having a door, of a hitching and releasing device comprising a shank or body having a projection at an angle thereto, a spring-actuated pin carried by said body and normally engaging the projection, said projection and pin being adapted for connection with a part of the horse's head-gear, and separate flexible connections extending from the body and pin respectively to separated points of attachment adjacent to the doorway, substantially as described.

In testimony whereof I affix my signature in presence of two witnesses.

REUBEN A. KETTLE.

Witnesses:
C. W. FAULKNER,
E. D. RANKIN.